United States Patent [19]
Frisque et al.

[11] 4,128,528
[45] Dec. 5, 1978

[54] CLAY-POLYMER CONCENTRATES FOR BENEFICIATING CLAYS

[75] Inventors: Alvin J. Frisque, La Grange, Ill.; Arthur R. McDermott, Houston, Tex.

[73] Assignee: Nalco Chemical Company, Oak Brook, Ill.

[21] Appl. No.: 820,676

[22] Filed: Aug. 1, 1977

Related U.S. Application Data

[63] Continuation of Ser. No. 577,588, May 15, 1975, abandoned, which is a continuation-in-part of Ser. No. 486,553, Jul. 8, 1974, abandoned.

[51] Int. Cl.$^2$ .............................................. C09K 7/02
[52] U.S. Cl. ............................. 260/42.55; 252/8.5 A; 252/8.5 P; 260/29.6 WQ
[58] Field of Search ................. 260/29.6 WQ, 29.6 H, 260/42.55; 252/8.5 A, 8.5 P

[56] References Cited

U.S. PATENT DOCUMENTS

| | | | |
|---|---|---|---|
| 3,081,260 | 3/1963 | Park | 252/8.5 C |
| 3,323,603 | 6/1967 | Lummus et al. | 252/8.5 A |
| 3,624,019 | 11/1971 | Anderson et al. | 260/29.6 H |

*Primary Examiner*—John C. Bleutge
*Attorney, Agent, or Firm*—John G. Premo; Robert A. Miller

[57] ABSTRACT

A method is disclosed for the preparation of concentrated, homogeneous, free flowing clay-polymer powders which upon addition to an aqueous solution may be inverted so as to produce a beneficiated clay.

3 Claims, No Drawings

CLAY-POLYMER CONCENTRATES FOR BENEFICIATING CLAYS

This is a continuation of application Ser. No. 577,588 filed on May 15, 1975, now abandoned which is a continuation-in-part of our copending application, Ser. No. 486,533, filed July 8, 1974 now abandoned.

INTRODUCTION

This invention relates to a new method and composition concerning homogeneous, concentrated, free flowing, clay-polymer powders. These powders are formed by adding a water-in-oil emulsion of a water soluble vinyl addition polymer directly to a powdered clay with agitation. The oil phase of the water-in-oil emulsion serves as a carrier causing the polymer particles to be homogeneously dispersed throughout the clay while maintaining the free flowing powder characteristics of the starting clay. This clay-powder depending on the concentration of the polymer within the clay can be either mixed with more clay or used as is so as to produce a beneficiated clay when added to an aqueous solution or fluid. The clay-polymer powders of our invention when added to water produce a beneficiated clay slurry due to the fact that the water-in-oil emulsion absorbed onto the clay powder inverts causing the polymer to solubilize, giving a rapid increase of viscosity to clay-polymer water mixture.

The use of water-soluble acrylamide polymers as thickening agents, is well-known in the art. Commercially, these polymers are available in two forms: as a dilute liquid; and as a solid.

The dilute liquid acrylamide polymer solutions, have two disadvantages. One, due to the viscosity of the high molecular weight material in water, they must be shipped as extremely dilute solutions, usually within the range of 0.5 to 3% polymer solids. Also, because they are so dilute, they cannot be used in applications where a more concentrated solution is desired. The solid acrylamide polymers are most often available commercially as powders or as finely divided solids. Due to their large particle size, a 100 mesh particle, being on the order of a 150 microns, it is difficult to disperse these polymers uniformily in clay solutions. In order to assure uniform distribution, they must be dissolved in water. Although the various polymers used are soluble in water, difficulty is often experienced in preparing aqueous polymer solutions because of slow dissolution, and because the solid polymer is not readily dispersible in water. Furthermore, dispersion of solid polymers in water is hindered by their tendency to clump or remain as agglomerates on contact with water. Lumps of solid polymer immediately form by the agglomerating. Although many of the lumps are eventually dissolved by continued agitation, it is frequently impractical to agitate the solution for a sufficiently long period of time to obtain complete dissolution.

It would, therefore, be an advantage to the art if a compound could be found which would be easier to use and provide equivalent results. It is, therefore, the method of our invention to provide to the art a clay-polymer powder which when added to an aqueous fluid will produce a beneficiated clay in the aqueous medium. The method of this invention involves adding a water-in-oil emulsion of a finely divided acrylamide polymer to a clay powder with agitation so as to evenly disperse the emulsion in the clay. The water-in-oil emulsion is carried throughout the clay by the hydrophobic phase of the emulsion which is absorbed onto the surface of the clay resulting in a free flowing powder clay which contains polymer dispersed through the clay-polymer powder. This material may then be added to water whereupon the polymer inverts with the resulting benefication of the clay.

OBJECTS

It is, therefore, an object of our invention to provide a clay-polymer powder which is free flowing and which will release the polymer contained therein upon the addition of the clay powder to an aqueous fluid.

Another object of this invention is to provide a method for thickening of clays by adding to the clay a water-in-oil emulsion of a finely divided acrylamide polymer followed by adding this free flowing mixture to an aqueous system thereby producing a beneficiated clay solution.

A further object of this invention is to provide a method for producing a clay-polymer powder concentrate which can be used in a single addition to produce a beneficiated clay in an aqueous system.

Other objects will appear hereinafter.

THE INVENTION

This invention involves a method for producing a clay-polymer powder using a water-in-oil emulsion of a finely divided acrylamide polymer and the method for using this concentrate.

The polymers most commonly used in the application of this invention are acrylamide polymers which include polyacrylamide and its water-soluble nonionic, cationic or anionic copolymeric derivatives such as, for instance, acrylic acid, methacrylic acid, itaconic acid, dimethylaminoethylmethacrylate, acrylonitrile and styrene. The copolymers contain from about 5 to 95% by weight of acrylamide. The molecular weights of such polymers exceed 500,000.

A polymer also useful in the practice of this invention is hydrolyzed polyacrylamide which has from 1 to 50% of the original carboxamide groups hydrolyzed to carboxyl groups.

The molecular weight of the polymers described above may vary over a wide range, e.g., 10,000 to 25 million. The preferred polymer has a molecular weight in excess of 1 million.

In general, the polymer emulsions are stable yet at the same time contain relatively large amounts of polymer. The polymers dispersed in the emulsion are quite stable when the particle size of the polymer is within the range of 2 millimicrons up to about 5 microns. The preferred particle size is within the range of 5 millimicrons and 3 microns.

It is extremely important for the purposes of our invention that particle size is kept as small as possible. This is due to the fact that the small particles are more easily blended in a uniform fashion than large particles.

The stable water-in-oil emulsion comprises:
1. An aqueous phase;
2. A hydrophobic liquid; and
3. A water-in-oil emulsifying agent.

The polymer-containing emulsion of this invention is comprised of an aqueous phase ranging between 30 and 95% by weight of the emulsion. The aqueous phase is defined as the sum of the polymer or copolymer and the water present in the composition. The preferred range is between 70 and 90% by weight of the emulsion. The most preferred range is between 70 and 80% by weight of the emulsion.

The present invention has a polymer concentration between 10 and 50% by weight of the emulsion. A preferred range is between 25 and 40% by weight of the emulsion. The most preferred range is between 25 and 35% by weight of the emulsion.

The organic or oil phase of the emulsion is comprised of an inert hydrophobic liquid. The hydrophobic liquid usually comprises between 5 and 70% by weight of the emulsion. The preferred range is between 5 and 30% by weight of the emulsion. The most preferred range is between 20 and 30% by weight of the emulsion.

The oils used in preparing these emulsions may be selected from a large group of organic liquids which include liquid hydrocarbons and substituted liquid hydrocarbons. Preferred groups of organic liquids are hydrocarbon liquids which include blends of aromatic and aliphatic hydrocarbon compounds, which contain from 4 to 8 carbon atoms. Thus, such organic hydrocarbon liquids as benzene, xylene, toluene, mineral oils kerosenes, naphtha, and in certain instances, petroleums may be used. A particularly useful oil from the standpoint of its physical and chemical properties is the branch-chain isoparafinic solvent sold by Humble Oil and Refinery Company under the tradename "Isopar M". Typical specifications of this narrow-cut isoparaffinic solvent are set forth below in Table I.

TABLE I

| Specification Properties | Minimum | Maximum | Test Method |
|---|---|---|---|
| Gravity, API at 60/60° F | 48.0 | 51.0 | ASTM D 287 |
| Color, Saybolt | 30 | — | ASTM D 156 |
| Aniline Point, ° F | 185 | — | ASTM D 611 |
| Sulfur, ppm | — | 10 | ASTM D 1266 (Nephelometric mod.) |
| Distillation, ° F | | | |
| IBP | 400 | 410 | |
| Dry Point | — | 495 | |
| Flash point, ° F (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is usually present in amounts ranging between 0.1 and 21.0% by weight of the emulsion. The preferred range is between 1.0 and 5.0% by weight of the emulsion. The most preferred range is between 1.2 and 3.0% by weight of the emulsion.

The polymers contemplated for use in this invention may be synthesized in emulsion form as described in Vanderhoff et al, U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al., U.S. Pat. Nos. 3,624,019 and 3,734,873, both of which are hereby incorporated by reference.

THE METHOD

Once the water-in-oil emulsion of a finely divided acrylamide polymer is prepared, it is added to a clay powder. The substance used as the clay may include clays, lignosulfonates, and minerals so long as hydrophobic phase is absorbed onto the material selected. Preferred clays for use in our invention include naturally occurring alumino-silicates, and include bentonite (montmorillonite type materials). Preferably the water-in-oil emulsion of the water soluble polymer is added to the clay at a weight percentage of from 0.1 to 40% based on the dry clay powder. Most preferably, from 10 to 30% by weight of the emulsion containing polymer is added to the dry clay powder. This mixture is then agitated to produce a homogeneous concentrated clay powder containing the polymer. At the levels described above, the clay totally absorbs the hydrophobic liquid phase from the water-in-oil emulsion of the finely divided vinyl addition polymer with the result being that a free flowing powder is achieved. This treated clay will still have the characteristics of a free flowing powder although with higher polymer additions than those described above the clay may not be able to absorb all of the hydrocarbon liquid in the hydrophobic phase with the result being that a "wet" looking product may be formed which is not free flowing. This is surprising in the fact that upon the addition of the polymer to the clay and due to the relative amounts of the aqueous phase and oil phase contained within our preferred water-in-oil emulsions it would be expected based on the teachings of Anderson et al., U.S. Pat. No. 3,624,019 that the clay would cause the polymer to invert creating a thickened mass rather than the free flowing powder obtained.

After the clay-polymer powder is formed by the methods described above it may be used in a variety of applications. In order to successfully employ this mixture for the purposes which we have contemplated in our invention it will be necessary to add the clay-polymer powder to an aqueous system so as to provide a thickened clay solution having a polymer concentration of between 0.1 and 10% by weight of the aqueous solution. This is due to the fact that upon the addition of water, the polymer contained within the clay will invert so as to give the desired effect.

Additionally, if more clay is desired then is achieved by the addition of our mixture to the aqueous solution clay can be added to the mixture of our invention itself, or in the alternative it may be added separately so as to cause the same end result.

Oftentimes, in the practice of our invention we have found it necessary to add a hydrophillic surfactant to the aqueous fluid into which the clay-polymer powder is added. These surfactants are typically added in low concentrations, in amounts ranging from 0.01 to 50% by weight based on the polymer contained in the clay-polymer powder. Generally, the surfactant concentration when it is needed will be in the range of 1.0 to 10% by weight of the polymer contained within the clay. The preferred surfactants are hydrophilic and are further characterized as being water-soluble. Any hydrophilic-type surfactant such as ethoxylated nonyl phenols, ethoxylated nonyl phenol formaldehyde resins, dioctyl esters of sodium sulfosuccinate, and octyl phenol polyethoxyethanol can be used. Basically, any anionic, cationic or nonionic surfactant can be employed in this invention. The surfactants are fully disclosed in U.S. Pat. No. 3,624,019. The surfactants chosen, however, should be tried on a case-by-case basis due to variances in the water-in-oil emulsions, the clay, and the quality of the water into which the polymer is inverted.

It is pointed out that it is oftentimes not necessary to use the hydrophillic surfactant and its usage will be dictated by the nature of the water-in-oil emulsion of the finely divided water soluble vinyl addition polymer so employed. Typically, in the applications which we have contemplated which include but are not limited to the formation of drilling muds, bases for earthen dams and clay "cements" the final material should employ polymer in the range of 0.1 to 10% of the total mixture with the clay comprising a substantial portion of the mixture.

The amount of polymer, clay, and water used, will depend on the desired viscosity of the thickened clay. The use of more water will cause a decrease in viscosity. The use of greater amounts of polymer and greater amounts of clay will cause an increase in the viscosity. The following examples are offered to illustrate our invention.

EXAMPLE 1

| Acrylamide emulsion recipe: | |
|---|---|
| ISOPAR M | 27.6 grams |
| Sorbitan Monostearate | 1.65 grams |
| Water | 40.20 grams |
| Acrylamide | 36.51 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor filled with a stirrer, thermometer, and nitrogen purge. The monomer solution was prepared by dissolving the acrylamide in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

EXAMPLE 2

| Acrylamide-acrylic acid emulsion recipe: | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams |
| 2,2'azobis (isobutyronitrile) | 0.07 grams |

As in Example 1, the sorbitan monostearate was dissolved in the ISOPAR M and the resulting solution was poured into a 2 liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

EXAMPLE 3

| Acrylamide-methacrylic acid emulsion recipe: | |
|---|---|
| ISOPAR M | 27.6 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a 2 liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60° C. with agitation. The reaction proceeded for 2½ hours at which time it had reached completion. The resulting product was a stable emulsion.

This invention is further illustrated by the following examples:

EXAMPLE 4

The water-in-oil emulsion of a finely divided acrylamide polymer of Example 2, was added to Wyoming sodium bentonite at a 5% level (1.7% polymer solids). This clay-polymer powder was free flowing and resembled the sodium bentonite prior to addition of the water-in-oil emulsion. A 1% solution of the sodium bentonite-polymer powder, in water, containing 0.17% nonylphenol which had been reacted with 10 moles of ethylene oxide, increased the viscosity from 50 to 100 cps as a result of this polymer addition. In practice, the sodium bentonite 5% polymer powder could be added to more sodium bentonite to achieve any intermediate viscosity.

EXAMPLE 5

The water-in-oil emulsion of a finely divided acrylamide polymer of Example 1, was added to a Wyoming sodium bentonite at 5% level (1.68% polymer solids). The clay-polymer mixture so produced was a free flowing powder which could be transported and handled with relative ease. A 1% solution of this sodium bentonite polymer powder in water containing 0.15% nonylphenol which had been reacted with 10 moles of ethylene oxide, increased the viscosity from about 50 to about 100 cps as a result of this polymer addition.

EXAMPLE 6

To 400 parts by weight of a sodium bentonite was added 100 parts of a water-in-oil emulsion similar to that of Example 2 containing approximately 32.0% by weight of a acrylamide-sodium acrylate polymer. This was done with agitation and produced a clay-polymer powder which was free flowing and which had a slightly darker color than the dry clay itself. This clay-polymer powder contained 6.4% polymer (20% water-in-oil emulsion). A 2% solution (based on the weight of clay and polymer) of the treated clay was substantially more viscous than a 2% solution of the untreated material.

We claim:

1. A homogeneous clay-acrylamide polymer composition which comprises:
   A. a dry clay powder; and
   B. from 0.1 to 40% by weight based on the weight of (A) of a water-in-oil emulsion of a finely divided water soluble acrylamide polymer, said water-in-oil emulsion of a water soluble acrylamide polymer comprising:
      a. 30–95% of an aqueous phase consisting of water and water soluble acrylamide polymer having a particle size ranging between 2 millimicrons up to about 5 microns,
      b. 10–50% of the water soluble acrylamide polymer, said water soluble acrylamide polymer containing at least 5% by weight acrylamide and having a molecular weight in excess of one million,
      c. 5–70% of an organic hydrophobic liquid,
      d. 0.1–21% by weight of a water-in-oil emulsifying agent;

said clay acrylamide polymer composition being characterized as being in the form of a homogeneous free-flowing powder to a damp powder and is prepared by adding (B) to (A).

2. The composition of claim 1 wherein the clay is a sodium bentonite.

3. The composition of claim 1 wherein the water-soluble acrylamide polymer is a copolymer of acrylamide and acrylic acid.

* * * * *